June 16, 1953
R. C. RUSSELL
2,642,050
VALVE MECHANISM
Filed Feb. 24, 1951
4 Sheets-Sheet 2
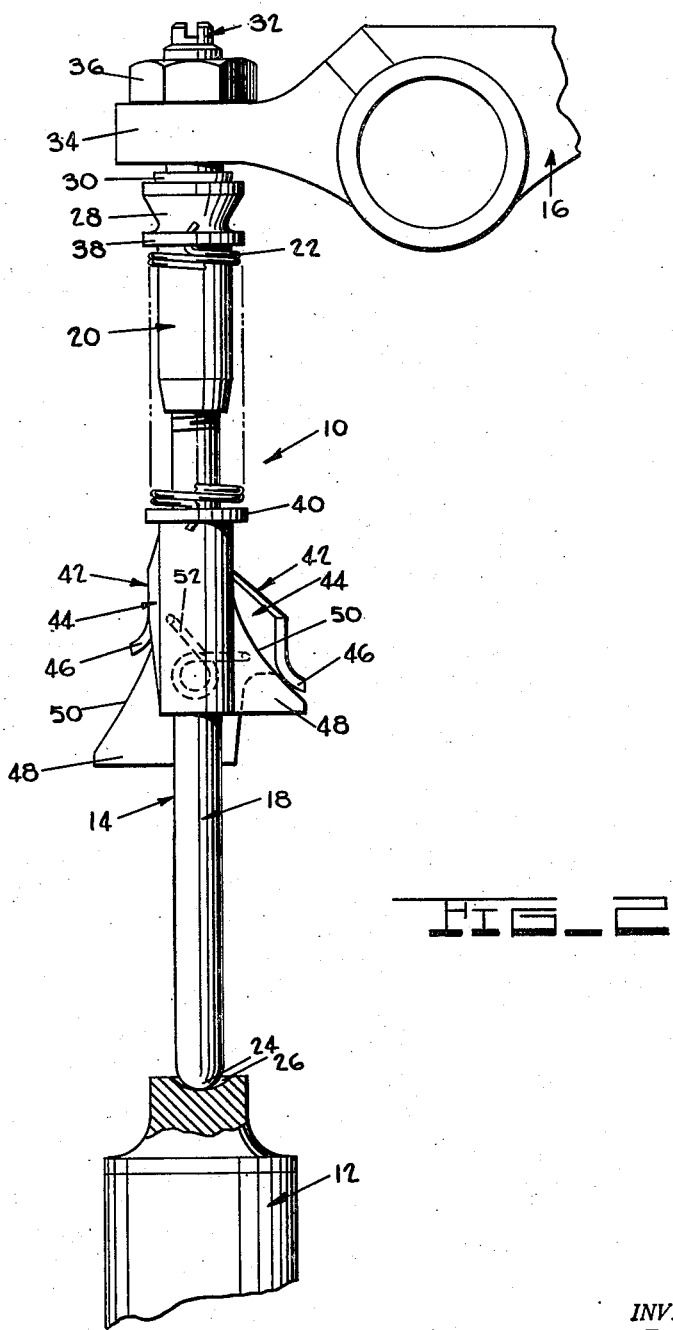
FIG_2
INVENTOR.
ROBERT C. RUSSELL
BY
McDonald & Feagro
ATTORNEYS

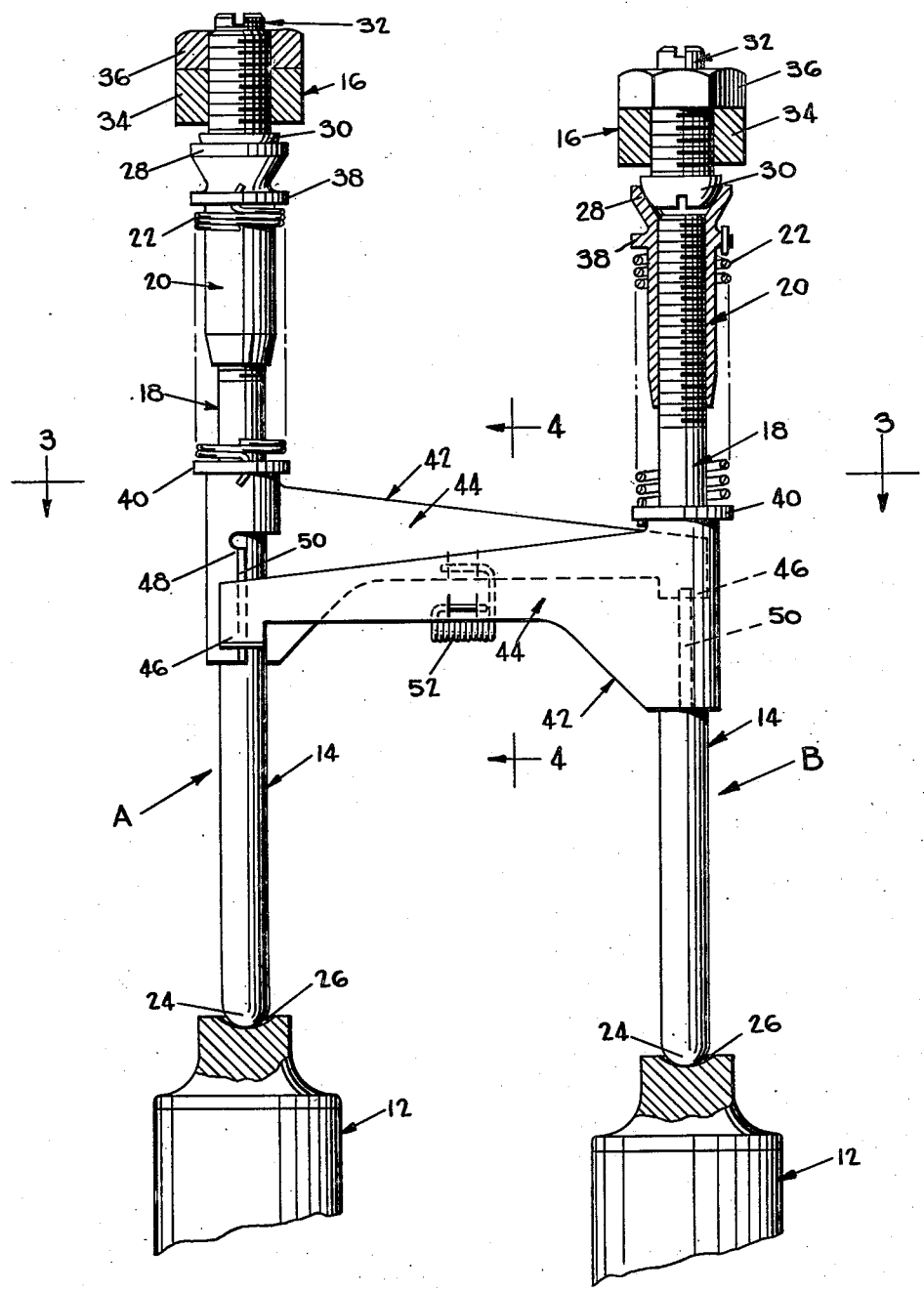

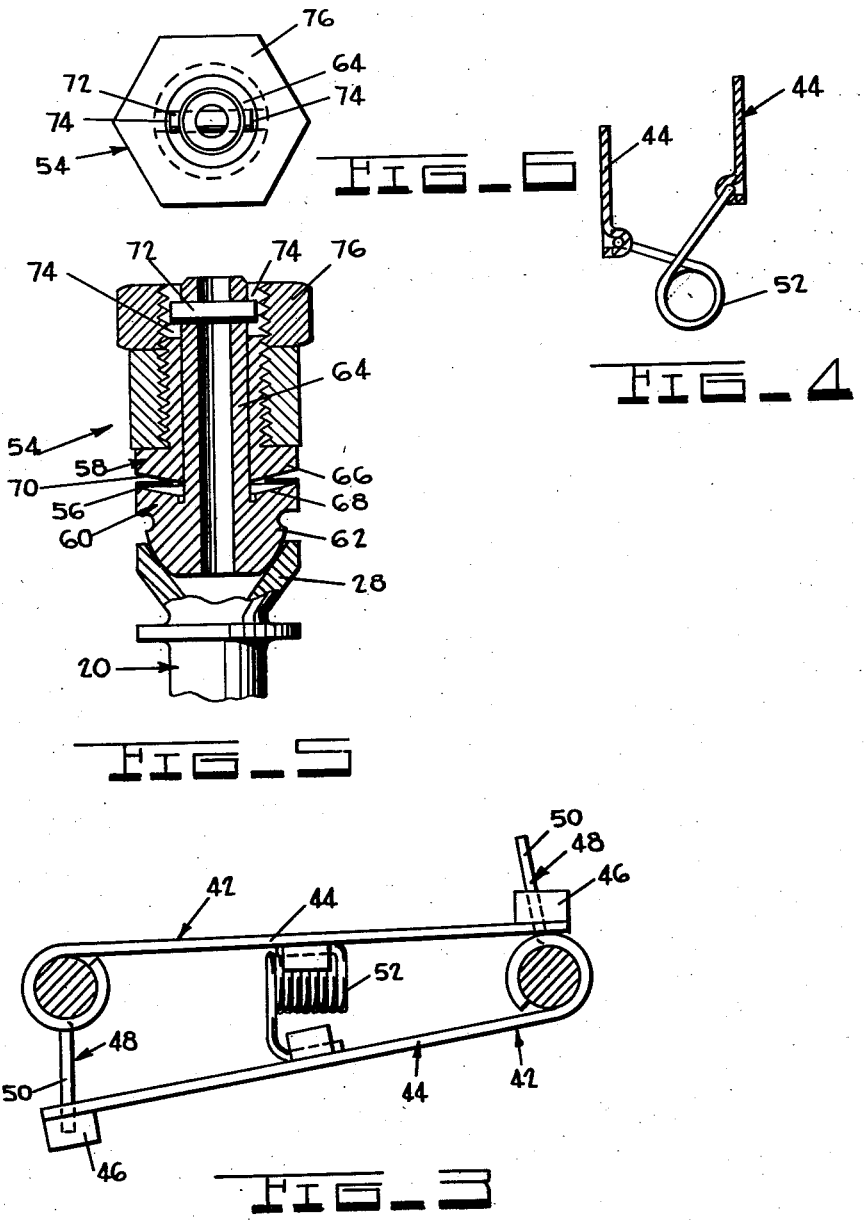

June 16, 1953 R. C. RUSSELL 2,642,050
VALVE MECHANISM
Filed Feb. 24, 1951 4 Sheets-Sheet 4
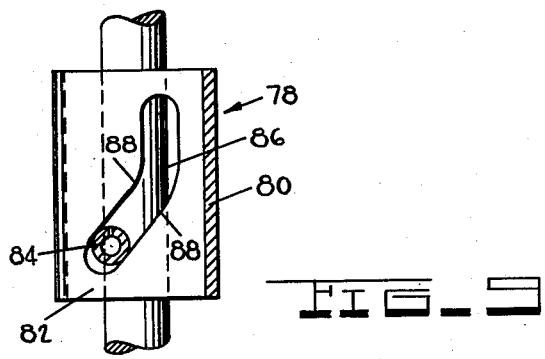
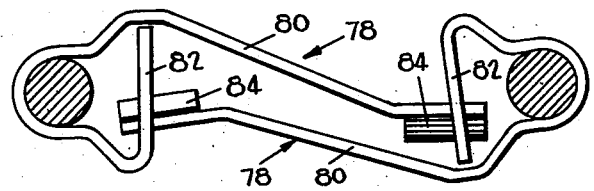
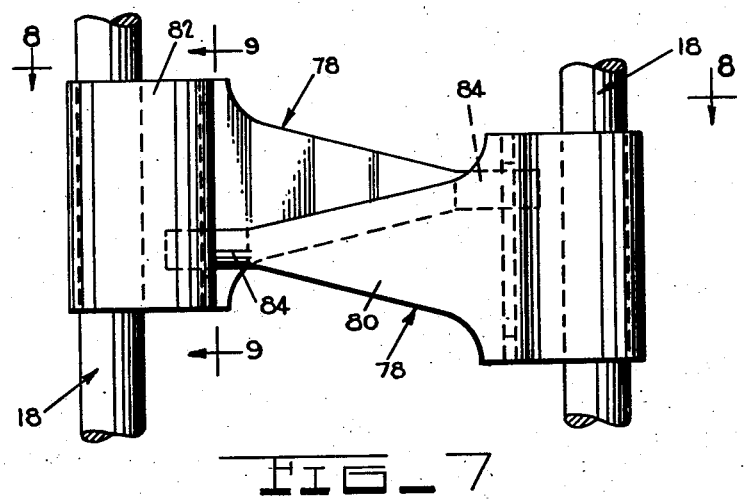
INVENTOR.
ROBERT C. RUSSELL
BY
ATTORNEYS Patented June 16, 1953

2,642,050

UNITED STATES PATENT OFFICE 2,642,050

VALVE MECHANISM

Robert C. Russell, Euclid, Ohio, assignor to Eaton Manufacturing Company, Cleveland, Ohio, a corporation of Ohio Application February 24, 1951, Serial No. 212,544

12 Claims. (Cl. 123—90)

This invention relates to valve operating mechanism and more particularly to means for automatically compensating for variations occurring in the length of said mechanism as a result of the operation thereof.

Broadly the invention comprehends the provision of means in the form of a torsion spring loaded screw and nut assembly incorporated as a part of the component members of a valve operating mechanism and wherein through a relative rotation between the screw and nut assembly a shortening in elongation compensation of the valve operating mechanism is achieved. The torsion spring provides for an elongation compensation of the mechanism by the act of biasing the members of the screw and nut assembly apart when clearance occurs in the mechanism and a part of one mechanism upon the opening cycle of the valve thereof operates to turn a member of the screw and nut assembly of the adjacent mechanism for a threading up action therebetween to provide a shortening compensation for said mechanism if required during a position of rest thereof. A similar operation is had between said adjacent mechanisms when the second mechanism is effecting a valve opening operation and the first mechanism is at rest.

Among the several objects of the invention are the following:

To provide means for mechanically automatically compensating for variations in length of the operating components of a valve operating mechanism resulting from operation thereof that is simple and practical of construction, economical to manufacture and effective and quiet in operation, that is applicable to conventionally used valve operating mechanism as either original or replacement equipment; that can be quickly installed as service replacement equipment in existing internal combustion engines without requirement for changing any of major elements of the valve operating mechanism; that includes the basic elements of a screw and nut assembly biased apart by a torsion spring forming a part of each valve operating mechanism together with lever means interconnected between adjacent valve mechanisms, said lever means being operative to alternately turn one member of each screw and nut assembly for a length shortening compensation of the mechanisms; that effects an automatic length compensation upon the base circle portion of the valve operating mechanism; that only operates to effect a length compensation when required; that compensates for eccentricities in the base circle portion of the cam; that is incorporated as part of the pushrod of the valve operating mechanism; and that is not subject to excessive wear thus permitting of an extended service-free life thereof.

Other objects and advantages of the invention will appear from the following description taken in connection with the drawings forming a part of the specification; and in which:

Fig. 1 is a front elevational partially fragmentary, partially cross-sectionalized view of a valve operating mechanism embodying the invention;

Fig. 2 is a side elevational partially fragmentary, partially cross-sectionalized view of Fig. 1;

Fig. 3 is a cross-sectional view taken substantially along lines 3—3 of Fig. 1;

Fig. 4 is a cross-sectional view taken substantially along lines 4—4 of Fig. 1;

Fig. 5 is a cross-sectional view of a modified form of adjustment screw from that incorporated in the structure of Fig. 1;

Fig. 6 is a top plan view of Fig. 5;

Fig. 7 is a fragmentary front elevation of a pair of operatively related pushrods incorporating a modified form of inter-engaging lever members from that shown in Figs. 1 and 2;

Fig. 8 is a cross-sectional view taken substantially along lines 8—8 of Fig. 7; and Fig. 9 is a cross-sectional view taken substantially along lines 9—9 of Fig. 8.

Similar reference characters indicate corresponding parts throughout the several views of the drawings.

This means for mechanically automatically compensating for length variation in valve operating mechanisms for internal combustion engines was devised for the purpose of providing an economical and practical structure which could be utilized either as original equipment in new internal combustion engines wherein the major component elements of a valve operating mechanism such as cam, tappet, pushrod, rocker arm and valve are adapted for the use thereof or as service replacement equipment wherein said structure is adapted to existing engine structure without requiring major changes therein. In so being utilized as replacement equipment it is only necessary in the case of overhead valve type of engines to remove the pushrods and adjustment screws from the rocker arms and insert a special adjustment screw in each rocker arm and replace the pushrods with pushrods incorporating length compensation means therein. Thus the newly added equipment not only will provide for length compensation of the valve operating mechanism but only account for the long ramp conventionally incorporated in standard designed cams.

The adjustment means in addition to being incorporated in each pushrod includes lever mechanism interengageable between the respective adjacent exhaust and intake valve operating mechanism such that the opening cycle of one mechanism by way of the lever mechanism effect an adjustment operation of the other mechanism before the opening cycle thereof. Each pushrod embodies threadingly engaged nut and screw members normally biased apart by a torsion spring and a lever member engageable with a lever member on the next adjacent pushrod such that upon opening cycle operation of one pushrod a part of the lever member therein engages a part of the lever member on the adjacent pushrod effective to thread up the screw and nut members for a shortening operation of the pushrod. This shortening of the one pushrod occurs prior to the valve opening cycle of operation thereof while the cam for actuating same is on its base circle. The other of the adjacent pair of pushrods is shortened when it is at rest on the base circle operation of its cam when the other pushrod is in its valve opening cycle of operation.

The adjustment screw used includes a spring washer in biasing relation between axially relatively movable parts thereof effective to account for the long ramp design of a standard cam to thus prevent premature opening of the valve which would occur if this correction were not made.

Referring to the drawings for more specific details of the invention 10 represents generally a valve operating mechanism comprising basically, a tappet 12, a pushrod 14 and a rocker arm 16 adapted in the case of the tappet to be engaged at one end by a cam, not shown, and the rocker arm upon its end, not shown, a valve, not shown.

Each pushrod 14 includes a slender screw element 18 and a nut element 20 threadingly engaged upon the screw element with a torsion spring 22 connected therebetween acting to bias the screw and nut elements apart. The free end of screw element 18 terminates in a rounded form 24 adapted to be received in a socket 26 of the tappet with only slight frictionally holding relation therebetween permitting of the free relative rotation of the screw element to the tappet. The free end of the nut element is enlarged to provide a conical walled socket 28 permitting of the reception therein of the spherical shaped end 30 of an adjustment screw 32. The screw is threadingly mounted in one arm 34 of the rocker arm and is locked therein in desired position by a lock nut 36 threaded thereon.

The spring 22 in being connected between the screw and nut elements has one end fixed on a collar 38 provided on the nut element and its other end fixed in a collar 40 provided on the nut element.

A lever member 42 is fixedly secured upon each screw element and includes a long arm 44 terminating in a finger 46, and a short arm 48 having a slide cam ramp 50 thereon, said arms being disposed substantially at right angles to one another.

In the case of the inter-engagement relation of the lever members of respectively adjacent valve operating mechanisms such as represented by Fig. 1 wherein one mechanism A can be designated as the exhaust valve mechanism and B the intake valve mechanism, a spring 52 is arranged in interconnected relation between the long arms of the respective lever members substantially mid-way of their length. With the spring 52 so arranged between arms 44 tending to hold them together the fingers 46 on the respective arms 44 bear upon the ramps 50 on the arms 48 of the other lever member. It is to be noted in the position shown by Fig. 1 that the respective operating mechanisms are out of phase to one another primarily because the mechanism B is in the position where its cam is riding on its base circle whereas the mechanism A is in its cycle of operation where its valve has been moved to full open position. During the course of the movement of the pushrod of mechanism A vertically upward and with the finger 46 of the lever member 42 of mechanism B bearing on ramp 50 of the lever member of mechanism A a turning of screw element 18 of mechanism B will result. Should the valve operating mechanism of mechanism B be under load of the valve spring as a result of the valve not being closed because of expansion in said mechanism the screw element thereof will be rotated, with relative movement normally occurring between the screw element and tappet because of the low friction connection provided therebetween to permit of this action. The screw elements rotation will not be imparted to the nut since the resistance to turning of the nut element 20 relative to the screw element 18 through the friction connection between the socket of the nut member and the spherical end of the screw 32 is greater than the resistance to relative movement between the threads of the screw and nut elements. The threads of the screw and nut elements are purposely made of as steep an angle as possible just so long as they are self-locking thereby permitting of ease in the threading up thereof against the resistance of torsion spring 22 when an axial load is imposed on the pushrod and rotation is imparted to the screw element.

It is obvious that in the event no load is imposed on the pushrod other than that of torsion spring 22 a rotation of the screw element 18 will be imparted to the nut element and no shortening of the rod will occur since it is rotated as a unit.

In the event wear or contraction occurs in the valve operating mechanism tending towards the introduction of clearance therein the torsion spring 22 arranged between the screw and nut elements will operate to elongate the pushrod and compensate therefor. This elongation normally occurs at base circle operation of the cam of the mechanism when the valve spring load is relieved although the pre-load condition of the spring 22 would permit of its operation at any time if necessity so requires.

When the pushrod of mechanism A moves vertically downward in a valve closing cycle of operation thereof the spring 52 in tending to draw the lever arms 44 of the respective mechanisms A and B together provides for the movement of the arm 44 of mechanism B and the pushrod 14 in association therewith as a unit with the finger 46 of arm 44 bearing on slide ramp 50 of the arm 48 of the lever member 42 of mechanism A to return to its normal rest position wherein both valve operating mechanisms A and B are in valve closed position. No elongation or shortening of the pushrod 14 of mechanism B occurs during the valve closing cycle of operation of mechanism A since with adjustment having been effected in the mechanism during the valve opening cycle of mechanism A, a turning imparted to lever member 42 of mechanism B turns the pushrod 14 connected therewith as a unitary structure since no load is imposed axially thereon resisting the turning thereof. Under these conditions the respective end extremities of the pushrod, the socket 28 of the nut element and the rounded end 24 of the screw element slip relative to their respective mating members the spherical portion 30 of screw 32 and socket 26 of tappet 12.

Similarly with the valve opening cycle of operation of mechanism A, mechanism B upon being actuated to open its valve through the medium of its lever member 42 rotates the screw element 18 of the pushrod of mechanism A to effect a shortening operation thereof if required. A closing cycle of operation of mechanism B results exactly reversely to the closing cycle of operation of mechanism A in that the lever member 42 and the pushrod associated therewith is returned to normal rest position with the lever member 42 of mechanism B.

Figs. 5 and 6 illustrate a modified form of adjustment screw 54 from that shown in the structures of Figs. 1 and 2 in that it incorporates a spring washer 56 between relatively axially movable elements 58 and 60 thereof. Element 60 defines a pin having an enlarged head 62 providing a spherical surface for reception in the socket of nut element 20 similarly to the screw of Fig. 1 and a cylindrical body 64 reciprocal in a threaded member constituting element 58. The element 58 in addition to being threaded for receipt in the threaded opening of the rocker arm has a bore therethrough receiving the cylindrical body of the pin for reciprocation therein and an enlarged head 66 having bearing relation on the underside of the rocker arm. The side of the head 62 of the element 60 opposite from the spherical surface thereon provides an annular conical surface 68 complementary to an annular conical surface 70 on the head surface of element 58 opposite from its bearing on the rocker arm. The spring washer 56 is arranged axially intermediate the conical surfaces 68 and 70 biasing the elements of the screw apart a predetermined amount representing the compensation for long ramps of standard cams with which the mechanism of Fig. 1 can be made to operate.

As a means of preventing relative rotation between the elements 58 and 60 of the screw 54 while at the same time permitting of axial movement therebetween, a pin 72 is fixedly secured upon element 60 with the opposite ends thereof received in diametrically opposite axial slots 74 in element 58. A nut 76 is threaded upon the element 58 of screw 54 for locking said screw in position in the rocker arm so as to insure against its movement therefrom.

Figs. 7 through 9 illustrate a modified form of inter-engaging lever arrangement from that shown by Figs. 1 through 4 in that the spring 52 is eliminated and a more compact lever arrangement is provided.

The lever arrangement of Figs. 7 through 9 includes a pair of identical lever members 78, each including integral lever arms 80 and 82 fixed medially of the arms upon a pushrod for common movement therewith. Whereas arm 80 bears similarity to arm 44 of the previously defined structure, arm 82 is comparable to arm 48. Each of the arms 80 terminates in a finger 84 which is in the form of a cylinder adapted to be received in a cam slot 86 of lever arm 82 for bearing relation upon opposite parallel cam surfaces 88. In fingers 84 being confined for movement in the cam slots 86 with close fitting relation to the cam surfaces 88 no spring is required between said lever members to maintain them in contacting operating relation. It is obvious with the lever members 78 in such interconnected relation that a similar operational result will be attained as the lever members 42 of the structures of Figs. 1 through 4 in that the one cam surface 88 will engage one portion of cylindrical finger 84 say in an opening cycle and an opposite portion of said finger will engage the opposite cam surface in a closing cycle.

In so interconnecting lever members 78 a decided compactness in structure is achieved over the lever members 42 arrangement whereby the arrangement is adaptable to confined spaces as well as a saving in the elimination of a spring as is required in the arrangement of lever members 42.

While this invention has been described in connection with certain specific embodiments, the principle involved is susceptible of numerous other applications that will readily occur to persons skilled in the art. The invention, therefore, is limited only as indicated by the scope of the appended claims.

What I claim is:

1. A valve operating mechanism comprising a pair of threadingly engaged screw and nut member assemblies, a spring for each screw and nut member assembly normally biasing the members of each assembly apart, means associated with one screw and nut member assembly engageable with means associated with the other screw and nut member assembly, each of said means including a pair of arms arranged substantially at right angles to one another near the axis of a screw and nut assembly with which it is associated, a finger at the extremity of one arm and a cam element on the other arm with the finger of one means engaging the cam element on the other means and the finger on the second means engaging the cam element on the first means, said engageable means associated with the screw and nut member assemblies operative upon alternate relative movement between the assemblies to provide for an alternate oscillation first of one of the members of one screw and nut member assembly and then of one of the members of the other screw and nut member assembly.

2. A mechanism according to claim 1 wherein yieldable means are connected between the engageable means.

3. A mechanism according to claim 1 wherein each cam element is in the form of a ramp upon which the engageable finger moves.

4. A mechanism according to claim 1 wherein each cam element is in the form of a slot with parallel cam surfaces bordering it and in which the finger is received for bearing engagement with the cam surfaces.

5. A mechanism according to claim 4 wherein the finger received in the slot is cylindrical in shape.

6. A mechanism according to claim 1 wherein each screw and nut member assembly constitutes a pushrod.

7. A mechanism according to claim 6 wherein each pushrod is disposed between a rocker arm and a tappet with solely frictional contacting relation therewith.

8. A mechanism according to claim 7 wherein the rocker arm includes an element supported therein, said element comprising a part fixedly secured in the rocker arm and a part resiliently biased therefrom but limited to axial movement thereto having frictional contacting relation with one end of the nut and screw member assembly.

9. A mechanism according to claim 8 wherein the part of the element moveable relative to the rocker arm has a pin fixed thereto slidable in slot means in the part of the element fixed to the rocker arm.

10. A mechanism according to claim 9 wherein the parts of the element present complementary conical surfaces to one another and between which a flat spring washer is disposed.

11. A mechanism according to claim 7 wherein the axial opposite extremities of each pushrod has annular line bearing contact with its respective tappet and rocker arm.

12. A valve operating mechanism comprising a pair of adjacent and parallel reciprocable operating valve gear automatic length adjusting devices, and linkage connecting the devices including a member connected to each of the devices having a pair of arms arranged substantially at right angles to one another near the axis of the device with which it is connected, a finger at the extremity of one arm and a cam element on the other arm with the finger of a member connected with one device engaging the cam element of the member connected with the other device and the finger on the second device engaging the cam element on the first device, the reciprocable movement of one device being operative, through the engagement of the cam on its member with the finger on the member of the other device, to shorten the length of the second device and a reciprocable movement of the second device being operative, through the engagement of the cam on its member, with the finger on the member of the first device, to shorten the length of the first device.

ROBERT C. RUSSELL.

References Cited in the file of this patent

UNITED STATES PATENTS

| Number | Name | Date |
| --- | --- | --- |
| 2,019,792 | Nieman | Nov. 5, 1935 |
| 2,066,976 | Holmes | Jan. 5, 1937 |
| 2,323,965 | Anglada | July 13, 1943 |
| 2,419,316 | Engemann | Apr. 22, 1947 |